United States Patent [19]
Konno et al.

[11] Patent Number: 5,663,778
[45] Date of Patent: Sep. 2, 1997

[54] LIQUID CRYSTAL DEVICES AND METHOD FOR MAKING THE SAME

[75] Inventors: Tadashi Konno; Guo Ping Chen, both of Miyagi-ken, Japan

[73] Assignee: Alps Electric Co., Ltd., Tokyo, Japan

[21] Appl. No.: 533,897

[22] Filed: Sep. 26, 1995

[30] Foreign Application Priority Data

Oct. 19, 1994 [JP] Japan ............................. 6-253995

[51] Int. Cl.$^6$ .................................................. G02F 1/1333
[52] U.S. Cl. ........................................... 349/122; 349/138
[58] Field of Search ................................. 359/74, 75, 51, 359/52, 93; 349/122, 123, 138

[56] References Cited

U.S. PATENT DOCUMENTS

| | | | |
|---|---|---|---|
| 4,836,655 | 6/1989 | Yamazaki | 349/122 |
| 5,196,952 | 3/1993 | Hirai et al. | 359/51 |

FOREIGN PATENT DOCUMENTS

| | | | |
|---|---|---|---|
| 1-94318 | 4/1989 | Japan | 359/75 |
| 3-168816 | 8/1991 | Japan . | |
| 4-245224 | 9/1992 | Japan | 359/74 |

*Primary Examiner*—William L. Sikes
*Assistant Examiner*—James A. Dudek
*Attorney, Agent, or Firm*—Guy W. Shoup; Patrick T. Bever

[57] ABSTRACT

A liquid crystal device comprises a pair of substrates each having an electrode on one side thereof and a liquid crystal layer filled in a space between the paired substrates wherein the paired substrates, respectively, have, on a side contacting the liquid crystal layer, a pattern embossed layer which is made of a material having a refractive index relative to an ordinary ray substantially equal to that of a liquid crystal in the liquid crystal layer. The pattern embossed layers of the respective substrates are so arranged as being fitted with each other when contacted with each other. The method for making such a device as set out above is also described along with a liquid crystal device having irregularities formed on a pair of substrates. The irregularities are made of a material whose dielectric constant is substantially equal to that of the liquid crystal substance used.

6 Claims, 14 Drawing Sheets

LIQUID CRYSTAL DEVICES AND METHOD FOR MAKING THE SAME

BACKGROUND OF THE INVENTION

1. Field of the Invention

This invention relates to a liquid crystal device for displaying images by application of an electric field to a liquid crystal layer and more particularly, to liquid crystal device of a scattering mode without use of any polarizer. The invention also relates to a method for making such a liquid crystal device as mentioned above.

2. Description of the Related Art

Various display modes of liquid crystal devices making use of liquid crystals are known including a birefringence mode, a polarization mode, a scattering mode and the like. Of these, the device of the scattering mode is now being widely used owing to its simple arrangement.

The known liquid crystal devices utilizing the scattering mode of liquid crystals include those of the dispersion type, the ferrodielectric liquid crystal type and the dynamic dispersion type. These devices make no use of any polarizer and can be realized inexpensively, so that intensive studies have now been made.

Of the scattering modes utilized for display, the dispersion type is described in detail for convenience' sake. The liquid crystal device of the dispersion type includes the following three classes of arrangements.

The first class consists of a liquid crystal device wherein a liquid crystal substance is microcapsulated, the resultant microcapsules are added to a polymer material to form a liquid crystal layer, and the liquid crystal layer is provided between a pair of substrates which are facing each other.

This type is so arranged that a refractive index ($n_o$) which is sensitized with light passing through the liquid crystal substance in the microcapsules along the direction of application of a voltage and a refractive index ($n_p$) sensitized with light passing through the dispersion medium of the polymer material are substantially equal to each other (i.e. $n_o=n_p$). The light passing through the liquid crystal layer along the direction of application of a voltage at the time of the application of the voltage is allowed to pass substantially at an equal refractive index through both the liquid crystal substance in the microcapsules and the polymer dispersion medium in the liquid crystal layer. Eventually, the liquid crystal layer becomes optically transparent and permits transmission of the light.

At the time when no voltage is applied, the liquid crystal substance in the individual microcapsules suffers only a slight alignment regulation force from the wall surfaces of the microcapsules. In this condition, the liquid crystal molecules, respectively, turn in random directions, so that the light passing through the respective microcapsules are scattered. Thus, the liquid crystal layer becomes opaque or cloudy, not permitting passage of light therethrough.

The second class includes a liquid crystal device wherein a liquid crystal substance is added to and dispersed in a polymer material to form a liquid crystal layer. This layer is provided between a pair of substrates in face-to-face relation.

Like the first type, this type is so arranged that a refractive index ($n_o$) of the dispersed liquid crystal substance through which light passes along the direction of application of a voltage and a refractive index ($n_p$) of the dispersion medium made of the polymer material through which light passes are substantially equal to each other (i.e. $n_o=n_p$). Accordingly, light passing through the liquid crystal layer along the direction of application of a voltage at the time of the application of the voltage is subjected to refractive indices which are equal in both the liquid crystal substance and the polymer material in the liquid crystal layer. Thus, the liquid crystal layer becomes optically transparent, through which light can pass.

When no voltage is not applied to the layer, the liquid crystal substance suffers only a slight alignment regulation force at the interfaces with the polymer material serving as the dispersion medium. In this condition, the liquid crystal molecules, individually, turn in random directions, under which light passing through the liquid crystal substance is scattered, resulting in an opaque liquid crystal layer and not permitting transmission of the light.

The third class comprises a liquid crystal device as shown in FIG. 18. In the figure, a liquid crystal substance 7 is provided as a dispersion medium and fine particles 13 of an isotropic material are dispersed in the liquid crystal substance 7 to form a liquid crystal layer 9. The liquid crystal layer 9 is provided between a pair of substrates 3, 3, each made of a base 1 and a transparent electrode 2 formed on the surface of the base 1, thereby obtaining a liquid crystal device 14.

The transparent electrodes 2 which are vertically kept away from each other are connected to a power supply 11 through a switch 12, by which a necessary potential can be supplied to the liquid crystal layer 9 as desired. The transparent electrodes 2, 2 may be appropriately formed with a protective film 4 on each surface thereof.

In this type of device, a refractive index ($n_o$) of the dispersed liquid crystal substance through which light passes along the direction of application of a voltage and a refractive index ($n_p$) of the dispersed particles, which are fine particles 13 of an isotropic material, through which light passes are substantially equal to each other (i.e. $n_o=n_p$). Accordingly, when light irradiated from below the liquid crystal device passes through the liquid crystal layer along the direction of application of a voltage at the time of the application of the voltage, the light is subjected to refractive indices which are substantially equal to each other on passage through the liquid crystal substance 7 used as the dispersion medium and also through the fine particles 13 made of an isotropic material and used as the dispersed particles in the liquid crystal layer 9. Thus, the light is able to transmit through the liquid crystal layer, so that the liquid crystal layer becomes optically transparent.

In contrast, when no voltage is applied to the layer, the liquid crystal substance 7 used as the dispersion medium suffers only a slight alignment regulation force from the interfaces with the substrates 3, 3 provided at opposite sides and also from the interfaces with the fine particles 13 made of the isotropic material. The liquid crystal molecules, respectively, turn in random directions. As a result, the irradiation light is scattered during the passage through the liquid crystal layer 9, resulting in the liquid crystal layer being opaque.

Of these classes, the third class is the simplest in arrangement. Thus, intensive studies have been recently made for practical usage.

However, with the known arrangement of the liquid crystal device of the third class shown in FIG. 18, the fine particles 13 which are dispersed in the liquid crystal layer 9 as being fine in size and having different densities. This is disadvantageous in that the liquid crystal substance cannot be charged into a cell according to a known vacuum injection method because of the hindrance of the fine particles 13 in the liquid crystal material. Accordingly, when assembling the liquid crystal device 14 of this type, the liquid crystal substance 7 dispersing the fine particles 13 therein is dropped on the surface of one of the substrates 3, 3 provided with spacers 6 thereon, on which the other substrate 3 is placed.

However, the above procedure involves a difficulty in satisfactorily preventing incorporation of bubbles, resulting in a very poor yield.

In a long-term use, the dispersed fine particles 13 are liable to locally settle at the bottom by the action of gravity as is particularly shown in FIG. 19. Alternatively, as shown in FIG. 20, the dispersed fine particles 13 may coagulate with one another. This impedes reliability of the liquid crystal device in use over a long time.

In order to solve the above problem, we made intensive studies and proposed a liquid crystal device in our Japanese Patent Application No. 5-341436.

The liquid crystal device of the application is as shown in FIG. 21 and includes a liquid crystal layer 9 between a pair of substrates 3, 3 each having an electrode 2 on the main surface of the substrate 3. The liquid crystal layer 9 comprises a liquid crystal substance wherein the twisting of the molecules is appropriately controlled, and spacers 6 for keeping a given space between the substrates 3, 3. The device is characterized in that the substrates 3, 3, respectively, have on the surfaces thereof protrusions 17 made of a material which has a refractive index substantially equal to that of the liquid crystal substrate 7 relative to an ordinary or extraordinary ray.

With the arrangement of the liquid crystal device 18, when irradiation light 21 passes, as shown in FIG. 22A, through the liquid crystal layer 9 along the direction of application of a voltage at the time of the application of the voltage, the light is subjected to refractive indices of the liquid crystal substance 7 serving as a dispersion medium and the fine particles 17 made of an isotropic material and serving as dispersed particles, which are substantially equal to each other. Thus, the light is transmitted as light 22 through the liquid crystal layer 9 which is optically transparent.

In contrast, as shown in FIG. 22B, when no voltage is applied, the dispersion medium of the liquid crystal substance undergoes only a slight alignment regulation force from the interfaces with the substrates 3, 3 at opposite sides and also with the dispersed particles which are fine in size and are made of an isotropic material. Thus, the molecules turn in random directions. When the irradiation light 21 passes through the liquid crystal layer 9, it is scattered as 23, so that the liquid crystal layer 9 is observed as opaque.

Since the device of the above-stated type has protrusions 17 fixed at the surfaces of the substrates 3, 3, a liquid crystal substance can be charged into a cell according to any known vacuum injection method. The incorporation of bubbles can be completely prevented, with a yield being remarkably improved. When the device is used over a long time, the protrusions are not locally shifted owing to the action of gravity or are not coagulated with one another at all, ensuring the long-term use of the liquid crystal device 18. This permits a simple construction without use of an expensive polarizer and can reliably realize a liquid crystal device which make use of the dispersion mode of liquid crystals.

However, this device is disadvantageous in that, as shown in FIG. 16, a distance, d'LC, between the protrusions 17 of the opposite substrates and a distance, dLC, between the protrusion-free portions differ from each other and that the dielectric constants of the liquid crystal molecules and the material for the protrusions are different from each other (i.e. the dielectric constant, $\epsilon LC$, of liquid crystal substances is approximately 18 and that, $\epsilon p$, of a resin material ranges from 3 to 5, so that a potential exerted on the liquid crystal may differ depending on the portion being applied therewith. For instance, when a voltage at a protrusion-free portion is taken as $E_o$, a voltage at a portion where protrusions 17 are formed at the opposite side substrates 17 is taken as ELC and the height of the protrusion is taken as Hp, the difference between the values of $E_o$ and ELC becomes greater at a greater value of Hp. This is particularly shown in FIG. 10. It will be noted that in FIG. 10, the distance, dLC is 8 μm, the dielectric constant, $\epsilon LC$, of a liquid crystal is 18 (marked as ●), and the dielectric constant, $\epsilon p$, of a resin constituting the protrusion is 3 (marked as ○).

When a non-uniform voltage is applied to the liquid crystal layer, the sharpness of the V/T characteristics lowers. This leads to, as shown in FIG. 17, a small width of effective hysteresis, ΔH, in bistable drive, making the bistable drive substantially difficult.

Since the voltage exerted on the liquid crystal layer is not uniform, the liquid crystal display may not be uniform in some cases.

SUMMARY OF THE INVENTION

An object of the invention is to provide a liquid crystal device wherein a liquid crystal substance can be charged into a cell according to a known vacuum injection technique with a high yield.

Another object of the invention is to provide a liquid crystal device which has a simple structure and wherein a distribution of voltage being applied to a liquid crystal layer is uniform.

A further object of the invention is to provide a method for making a liquid crystal device of the type mentioned above.

The above objects can be achieved, according to one embodiment of the invention, by a liquid crystal device which comprises a pair of substrates each having an electrode on one side thereof and kept away from each other to provide a space therebetween, and a liquid crystal layer filled in the space between the paired substrates wherein the paired substrates, respectively, have, on a side contacting the liquid crystal layer, a pattern embossed layer or body which is made of a material having a refractive index relative to an ordinary ray substantially equal to that of a liquid crystal in the liquid crystal layer, the pattern embossed layers of the respective substrates being so arranged that the pattern embossed layer of one of the substrates is exactly fitted with the pattern embossed layer of the other substrate when both substrates are in intimate contact with each other whereby when the paired substrates are kept away from each other, the pattern embossed layers are also kept away from each other at a given distance at any portion of the layers.

In this embodiment, when no potential is applied to the liquid crystal layer, the pattern embossed layer serves to scatter light therewith as being formed on the surfaces of the respective substrates. In addition, if a potential is applied to the liquid crystal layer, the potential becomes constant since the distance between the substrates is constant at any portion thereof irrespective of the presence or absence of the pattern embossed layers.

According to another embodiment of the invention, there is also provided a liquid crystal device which comprises a pair of substrates each having an electrode and kept away from each other to provide a space therebetween, and a liquid crystal layer filled in the space between the paired substrates wherein the paired substrates, respectively, have, on a side contacting the liquid crystal layer, irregularities which are made of a material having a refractive index relative to an ordinary ray substantially equal to that of a liquid crystal in the liquid crystal layer, and an average dielectric constant of the liquid crystal is substantially equal to a dielectric constant of the material for the irregularities. The irregularities are preferably in the form of protrusions.

In this second embodiment, since the irregularities formed on the surfaces of the respective substrates are made of a material whose dielectric constant is substantially equal to a dielectric constant of a liquid crystal substance, a potential applied to the liquid crystal layer becomes constant irrespective of the shape of the irregularities.

According to a further embodiment of the invention, there is provided a method for making a liquid crystal device which comprises the steps of:

cutting and dividing a precursor for embossing die member into a first die member and a second die member which have, respective, cut faces of a given protrusion and recess pattern and wherein the first and second die members have the cut faces which are exactly fitting with each on intimate contact thereof;

providing a pair of a first substrate and a second substrate each having an electrode on one side thereof and forming a film to be embossed with a die member, which is made of a thermoplastic resin material, on the one side of each of the paired substrates; and pressing or embossing the film formed on the first substrate with the first die member to transfer the given pattern to the film and also pressing the film formed on the second substrate with the second die member to transfer the given pattern to the film whereby the pressed pattern formed on the surface of the first substrate is fittable with the pressed pattern formed on the surface of the second substrate.

According to another embodiment of the invention, there is provided a method for making a liquid crystal device which comprises the steps of:

cutting and dividing a precursor for embossing die member into a first die member and a second die member which have, respective, cut faces of a given protrusion and recess pattern and wherein the first and second die members have the cut faces which are exactly fitting with each on intimate contact thereof;

applying a thermoplastic resin material onto the cut faces of the first die member and the second member according to the given protrusion and recess pattern, respectively; and providing a pair of substrates having, respectively, an electrode thereon and contacting one of the paired substrates with the first die member to transfer the applied thermoplastic resin material to the one substrate and contacting the other substrate with the second die member to transfer the applied thermoplastic resin material thereto whereby the second substrate has the given pattern capable of being fitted with the given pattern formed on the surface of the first substrate.

In these methods, the thermoplastic resin material is preferably made of a UV-curable resin and is applied onto the respective substrate after formation of a desired pattern, after which UV ray is irradiated on the applied resin and cured.

These methods are useful in readily fabricating the liquid crystal device of the first-mentioned embodiment.

BRIEF DESCRIPTION OF THE INVENTION

FIGS. 13A to 13C are, respectively, schematic views showing a procedure of making a pattern embossed layer wherein FIG. 13A shows a resin layer prior to pattern embossing, FIG. 13B shows the layer embossed with an embossing die member, and FIG. 13C shows the embossed layer after removal of the embossing die member;

FIGS. 14A to 14B are, respectively, schematic views showing another procedure of making a pattern embossed resin layer wherein FIG. 14A shows an embossing die member having an embossed layer therein, FIG. 14B shows the embossed layer attached to an electrode of a liquid crystal device.

Figure 14A:
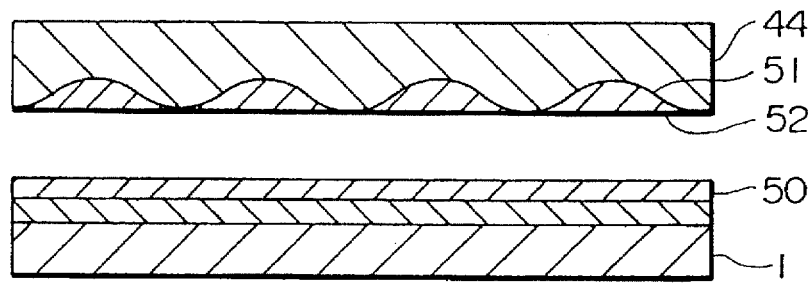
Figure 14B:
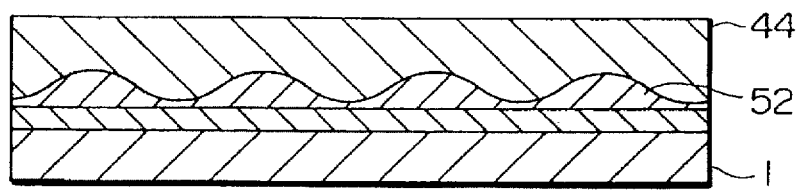
Figure 14C:
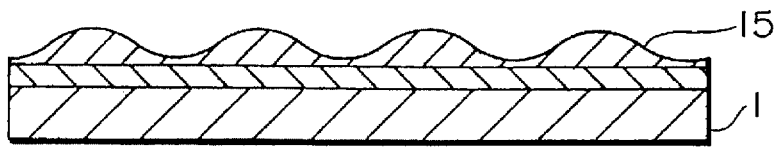
FIG. 14C shows the embossed layer after removal of the embossing die member.
Figure 15A:
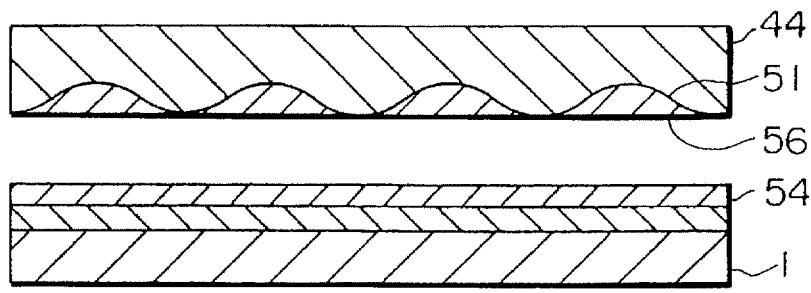
Figure 15B:
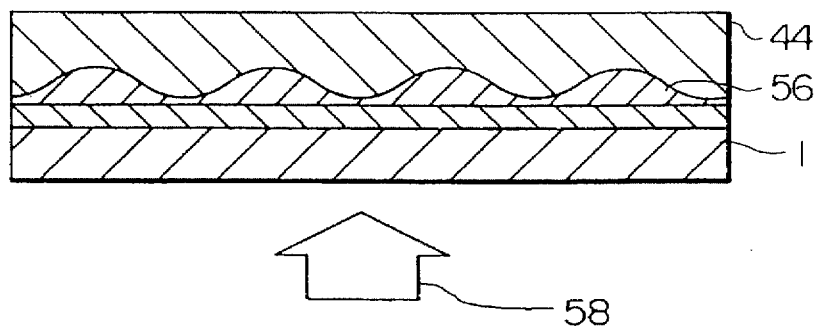
Figure 15C:
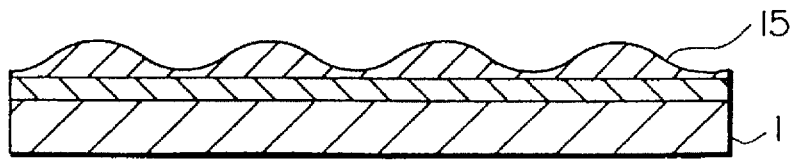
Figure 16:
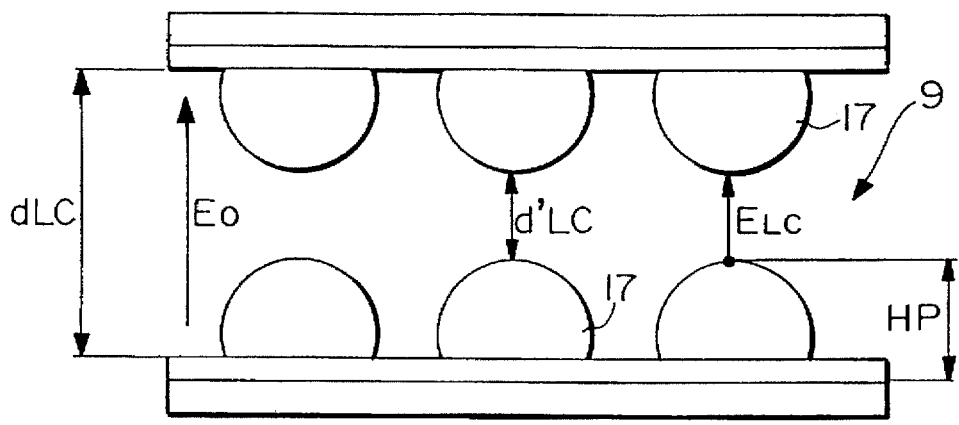
Figure 17:
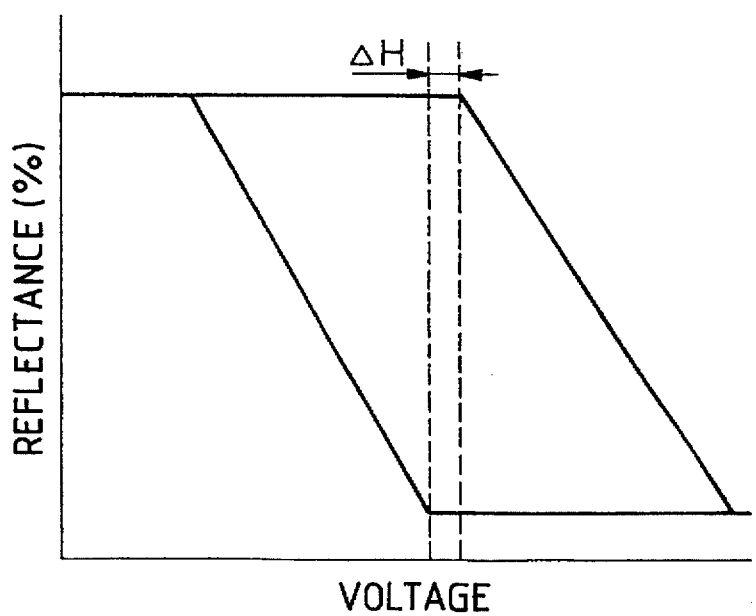
Figure 18:
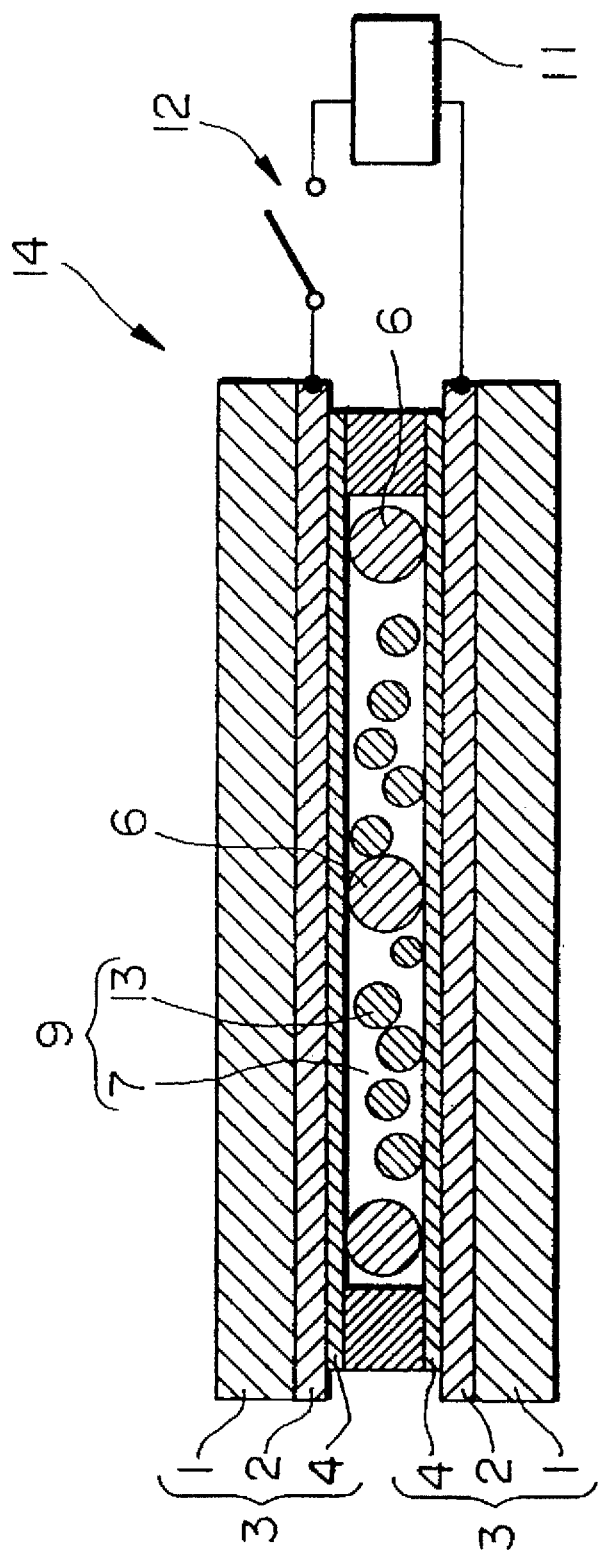
Figure 19:
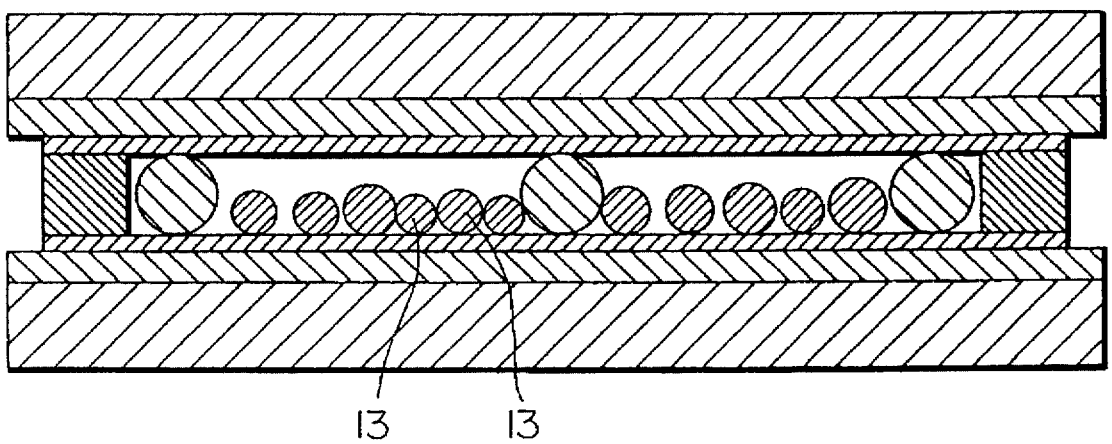
Figure 20:
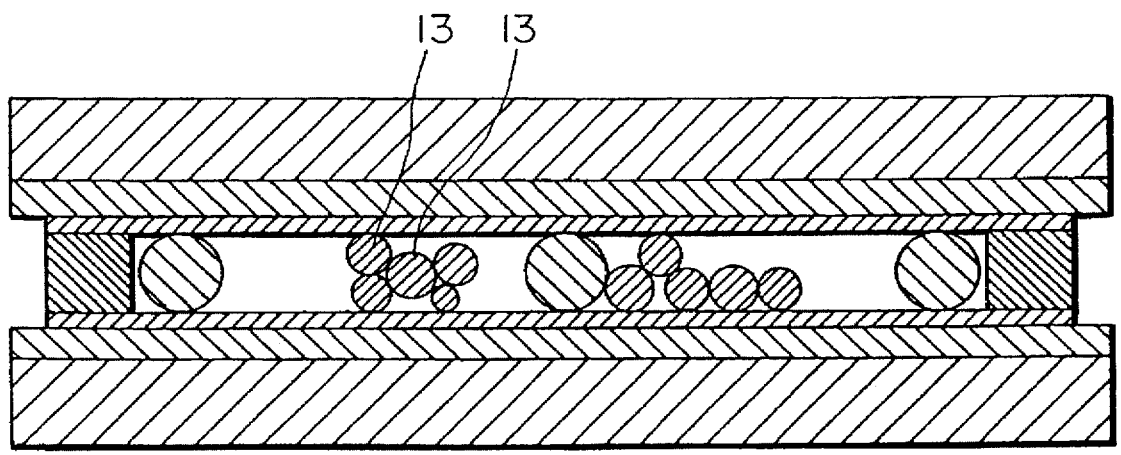
Figure 21:
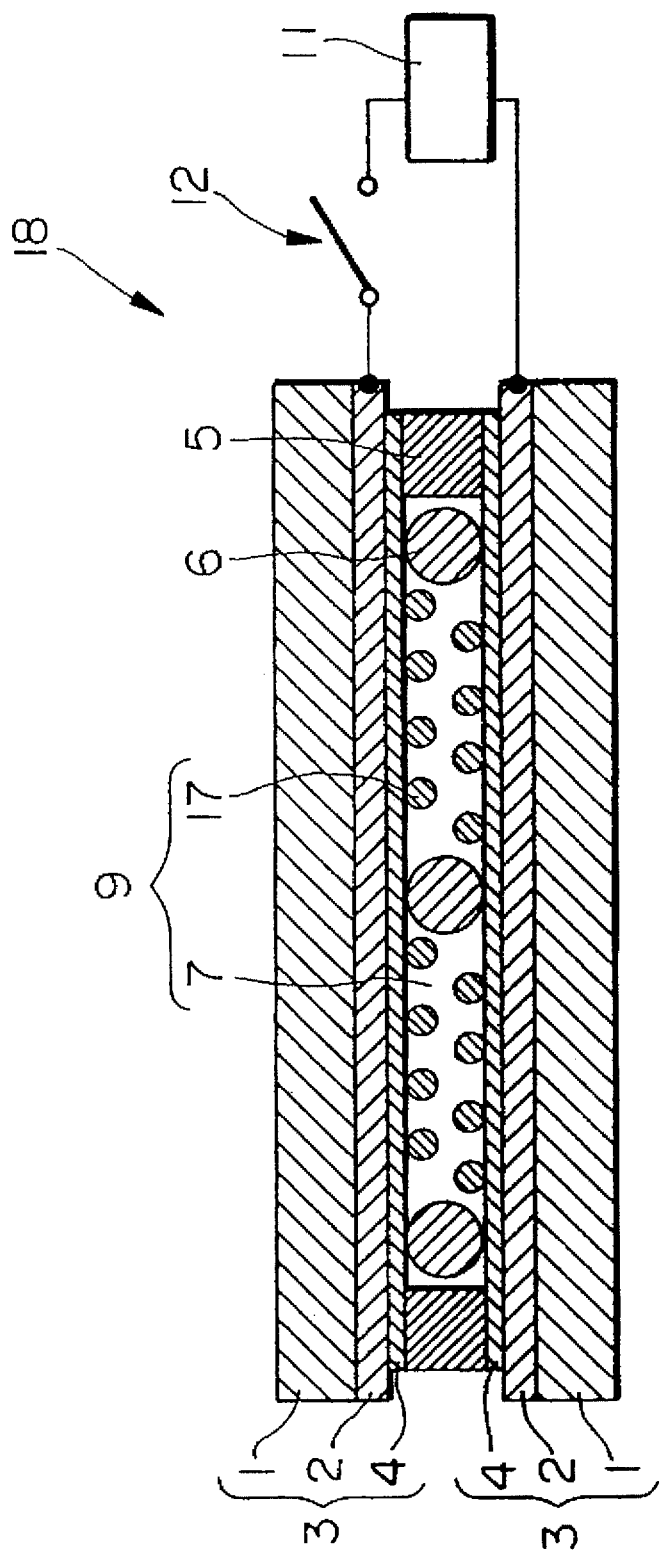
Figure 22A:
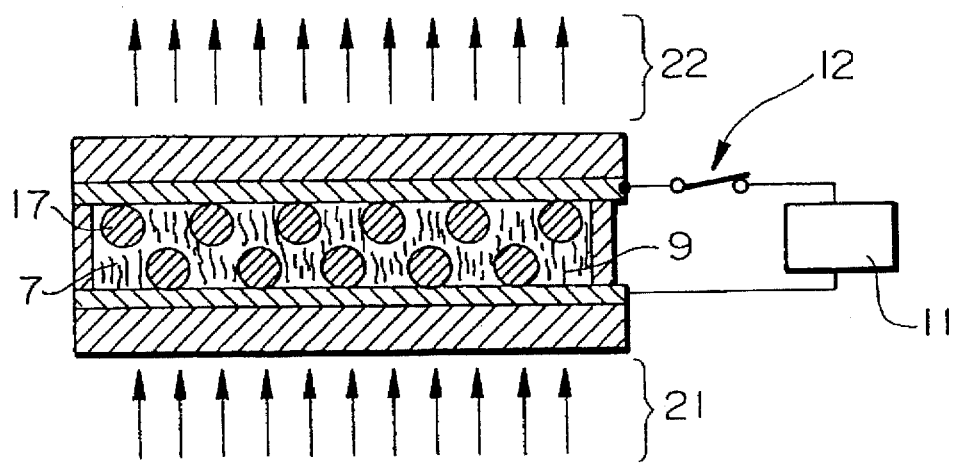
Figure 22B:
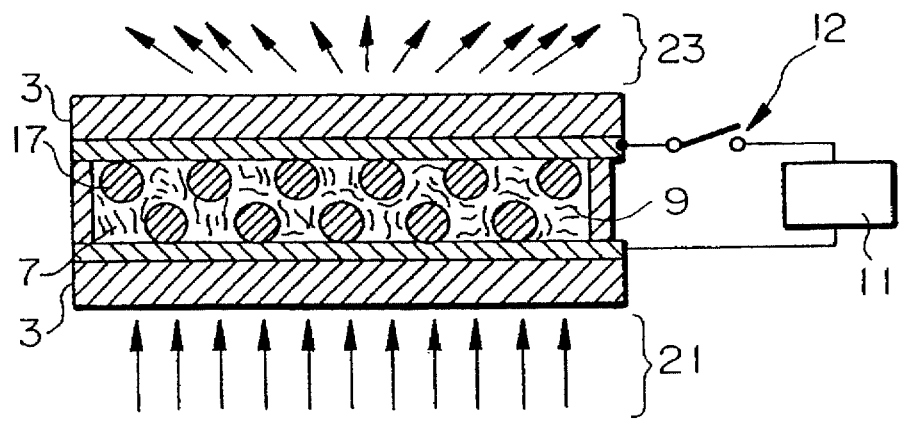

FIGS. 15A to 15C are, respectively, schematic views similar to FIGS. 14A to 14C and showing a further procedure of making a pattern embossed resin layer wherein FIG. 15A shows an embossing die member having an embossed layer therein, FIG. 15B shows the embossed layer attached to an electrode of a liquid crystal device while curing the layer by irradiation of UV light, and FIG. 15C shows the embossed layer after removal of the embossing die member;

FIG. 16 is a cross sectional view showing the non-uniformity of a voltage distribution in a known liquid crystal device;

FIG. 17 is a graph showing the relation between the reflectance and the voltage;

FIG. 18 is a cross sectional view showing a known liquid crystal device;

FIG. 19 is a cross sectional view showing another known liquid crystal device;

FIG. 20 is a cross sectional view showing another known liquid crystal device;

FIG. 21 is a cross sectional view showing another known liquid crystal device; and FIGS. 22A and 22B are, respectively, cross sectional views another known liquid crystal device wherein FIG. 22A shows the device being driven and FIG. 22B shows the device being not driven.

PREFERRED EMBODIMENTS OF THE INVENTION

The embodiments of the invention are described with reference to the accompanying drawings wherein like reference numerals indicate like parts or members unless otherwise indicated.

Embodiment 1

The first embodiment of the invention is of the type shown in FIG. 21 which deals with a known structure of a liquid crystal device. FIG. 21 generally shows a liquid crystal device 18 which includes a pair of substrates 3, 3. Each substrate 3 includes a base 1, and a transparent electrode 2 and a protective layer 4 formed on the base 1 in this order. The paired substrates 3, 3 are kept away from each other at a given space therebetween through a sealing member 5 provided along the periphery of the device so that the protective layers 4 are facing each other as shown in the figure. A liquid crystal layer or phase 9 including a liquid crystal substance 7 and spacers 6 are provided between the paired substrates 3, 3. The protective layers 4 have on the surface thereof protrusions 17 distributed at given intervals. In this figure, the protrusions are depicted substantially in the for of a sphere although the form is not limitative and any other form may be used. The respective transparent electrodes 2, 2 are, respectively, connected to a power supply 11 through a switch 12.

In the practice of the invention, the protrusions 17 are each made of a material whose dielectric constant has a dielectric constant, $\epsilon p$, which is substantially equal to an average dielectric constant, $\epsilon LC$, of the liquid crystal substance 7.

Figure 10:
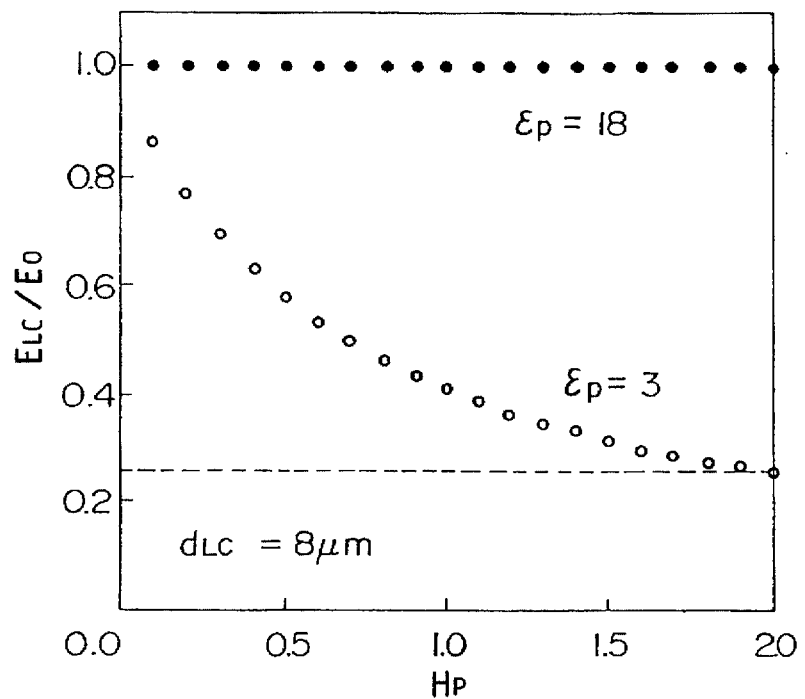
FIG. 10 is a graph showing the relation between the value of $ELC/E_o$ and the height of protrusions of a pattern embossed member.

By this, if the difference between the distances between dLC and d'LC shown in FIG. 16 is created, a given potential is applicable to the liquid crystal layer 9 irrespective of the existence of the protrusions 17. More particularly, when the liquid crystal substance has a dielectric constant, $\epsilon LC$, of 18, a resin material has a dielectric constant, $\epsilon p$, of 18 is used, by which as shown by the mark "●" in FIG. 10, the value of $E_r/ELC$ can be maintained at a constant value of 1 without suffering any influence of the height, Hp, of the protrusions.

The liquid crystal substances useful in the invention include, for example, a nematic liquid crystal (e.g. commercially available under the designation of PN-002 from Rodic Co., Ltd.), mixtures of the nematic liquid crystal and a cholesteric liquid crystal (commercially available under the designation of CM-33 from Chisso Co., Ltd.). Alternatively, those compositions which comprise the above-mentioned liquid crystal substances and one or more of dichromatic dyes dissolved in the substances.

The liquid crystal device of this embodiment makes use of a scattering mode without use of any expensive polarizer. Since the protrusions are fixed to the substrates, the liquid crystal substance can be poured into the cell according to a known vacuum injection method with a high yield. The device can stand a long-time use and is simple in structure. In addition, a uniform distribution of a voltage applied to the liquid crystal layer is ensured. The device is improved in sharpness of a V/T characteristic and has a great width of effective hysteresis, $\Delta H$, in bistable drive with the ease in substantial bistable drive, and can reduce unevenness of liquid crystal display.

The use of a material for the protrusions which has such a high dielectric constant, $\epsilon p$, as set out hereinabove, can enhance a so-called "first transition" of the liquid crystal device.

Figure 9:
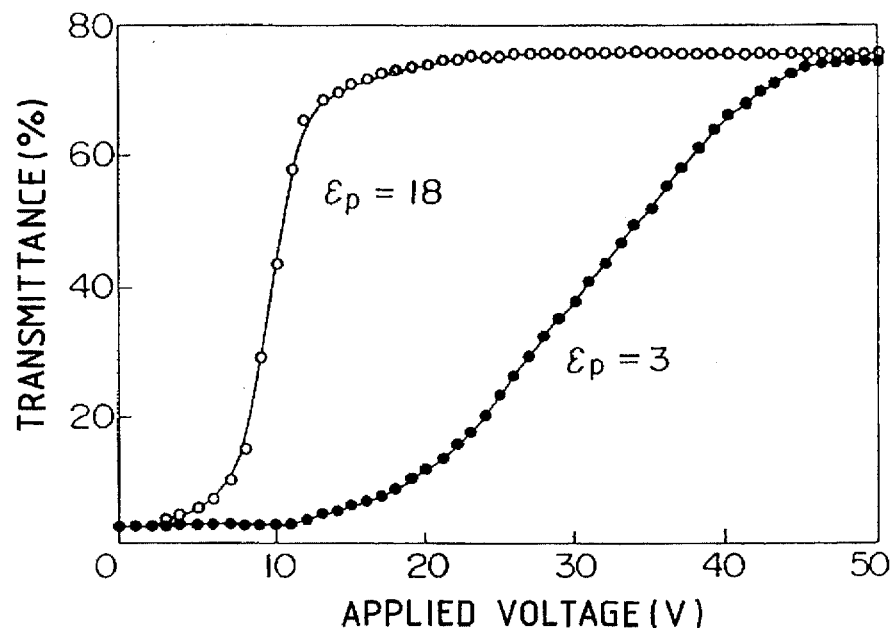
FIG. 9 is a graph showing the relation between the transmittance and the applied voltage for materials having different dielectric constants.

More particularly, FIG. 9 shows the relation between the transmittance and the applied voltage, revealing that when the dielectric constant, $\epsilon p$, is 3, the transmittance gradually increases relative to the applied voltage. In contrast, when using a material whose dielectric constant, $\epsilon p$, is high, the saturation voltage for driving the device lowers. When a dielectric constant $\epsilon p$ is 18, for example, the applied voltage is approximately 12 V, whereby the transmittance becomes substantially satisfactory.

This means that the liquid crystal device can be driven at a lower voltage, enabling one to drive a liquid crystal display device at low voltages. Thus, power consumption can be saved.

Even if the average dielectric constant, $\epsilon LC$, of a liquid crystal substance is not exactly equal to the dielectric constant, $\epsilon p$, of a material for the protrusions 17, a significant effect may be attained by causing these constants to be as close as possible. In the case, the value of $\epsilon p$ is increased as coming close to $\epsilon LC$, by which the non-uniformity of the voltage being applied throughout the liquid crystal layer is substantially mitigated, leading to the realization of a liquid crystal display device which can be driven at low voltages.

The highly dielectric resin materials useful in the practice of the invention include, for example, cyanoethyl cellulose, cyanoethyl poval ($\epsilon p=12$ to 13), cyanoethylhydroxyethyl cellulose ($\epsilon p=15$ to 17), cyanoethyl starch ($\epsilon p=15$) and chanoethylpullulan ($\epsilon p=18$ to 20) and the like.

Embodiment 2

Figure 1:
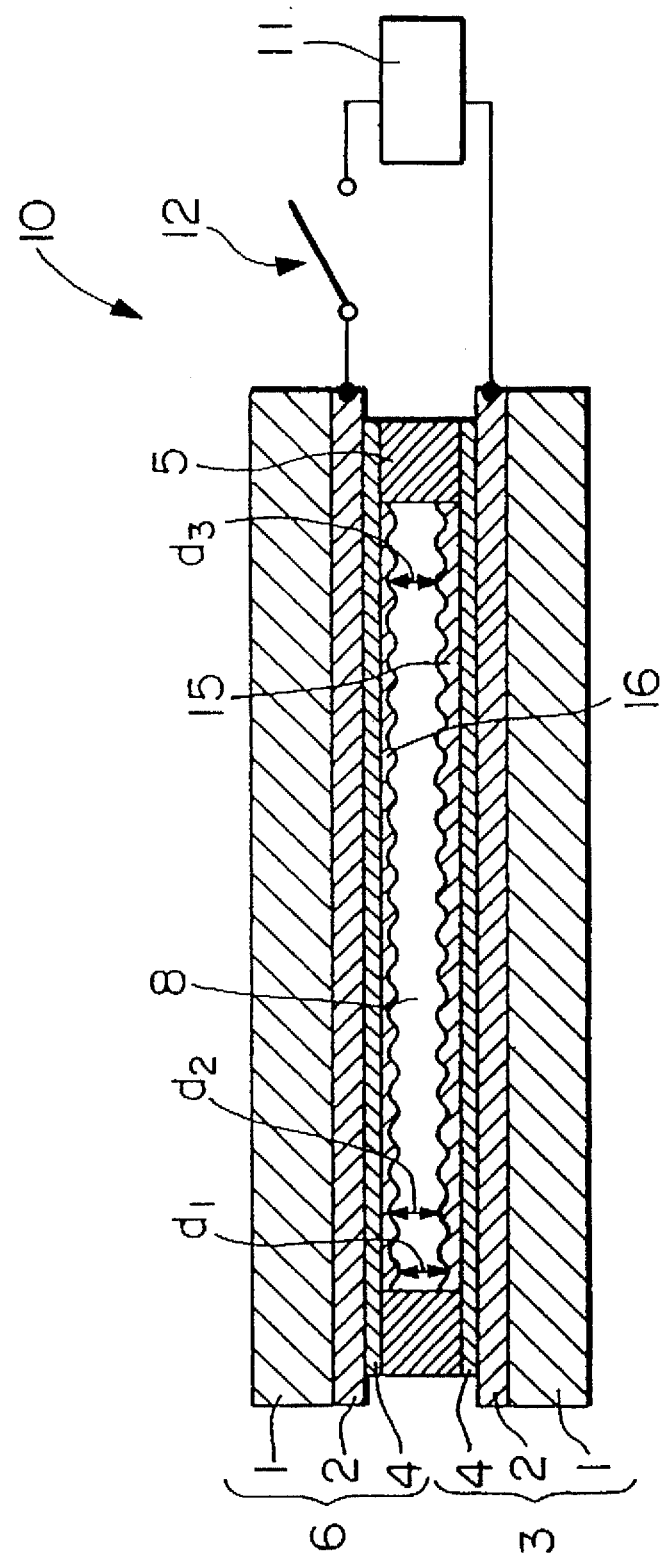
FIG. 1 is a cross sectional view of a liquid crystal device according to an embodiment of the invention.

FIG. 1 shows a liquid crystal device according to a second embodiment of the invention. A liquid crystal device 10 include a first substrate having a glass base 1, an electrode 2 and a protective layer 4, and a second substrate 6 having a glass substrate 1, an electrode 2 and a protective layer 3 formed as shown. The paired substrates 3, 6 has a liquid crystal layer 8 consisting of a liquid crystal substance filled therebetween. A sealing member 5 is provided between the substrates 3, 5 to hermetically accommodate the liquid crystal layer 8 therein. In order to keep the liquid crystal layer at a given thickness, fine spherical spacers (not shown) having a given size and made of a resin are provided between the substrates 3, 6. The electrodes 2, 2 are connected to a power supply 11 through a switch as in the first embodiment.

The substrates 3, 6 have, respectively, embossed pattern layers 15, 16 in a way form in section. The patterned layers 15, 16 are each made of a material which has a refractive index substantially equal to that of the liquid crystal substance.

More particularly, the pattern embossed layers are made, for example, of various types of thermoplastic resins whose refractive index relative to ordinary ray is substantially equal to that of a liquid crystal substance used. Aside from the thermoplastic resins set out above, polyamides, polyimides, polycarbonates, polyethers, polysulfones and fluorine resins may be used.

The embossed pattern layers 15, 16 are so shaped that when both substrates are brought to intimate contact with each other, the pattern layer 15 of the first substrate 3 is snugly fitted with the pattern layer 16 of the second substrate 6. In other words, the embossed pattern layers 15, 16 are so arranged that the protrusions in the wavy form of the pattern layer 15 are fitted with the recessed portions of the counter layer 16. Of course, the recessed portions of the layer 15 are engaged with the protrusions of the layer 16. The waves of the pattern layers 15, 16 as shown in FIG. 1 are shifted only by a half cycle from each other. Thus, the distance between the wavy layers 15, 16 becomes constant at any portions, $d_1$, $d_2$ and $d_3$, of the space between the substrates 3, 6.

The embossed pattern layers 15, 16 should preferably have a difference between the valley and the peak of the waves of 1 to 50 μm.

When the difference is smaller than 1 μm, a significant increase in surface area resulting from the wavy form is not expected, resulting in a small degree of light scattering. Over 50 μm, the gap between the electrodes becomes so great that a greater drive voltage is undesirably required.

Figure 2A:
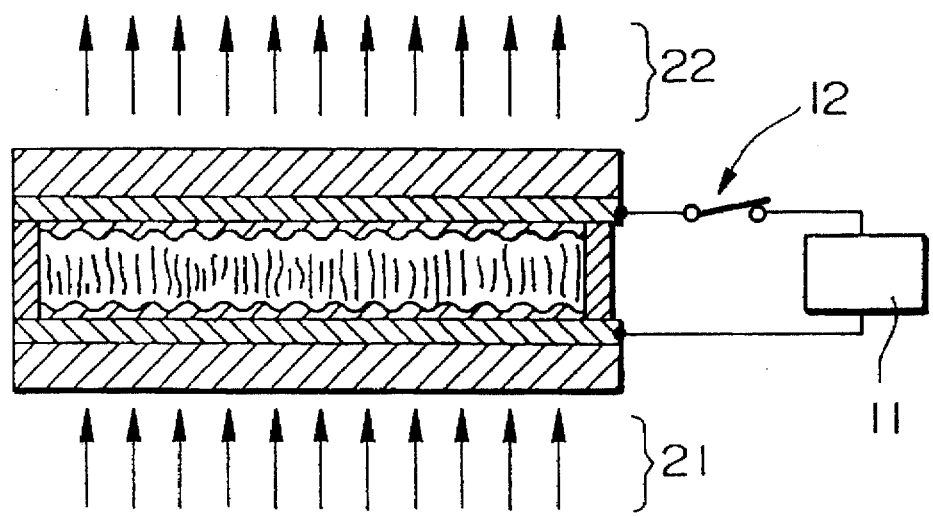
FIGS. 2A and 2B are, respectively, a schematic cross sectional view of a liquid crystal device for illustrating the driving operations thereof wherein a voltage is applied to the device in FIG. 2A and any voltage is not applied to in FIG. 2B.

In this arrangement, since the refractive index, $n_o$, of the liquid crystal relative to ordinary light is equal to the refractive indices $n_p$, of the pattern embossed layers 15, 16 (i.e. $n_{o=np}$), light 21 transmits, as shown in FIG. 2A, through the liquid crystal layer 8 along the direction of an applied voltage.

Figure 2B:
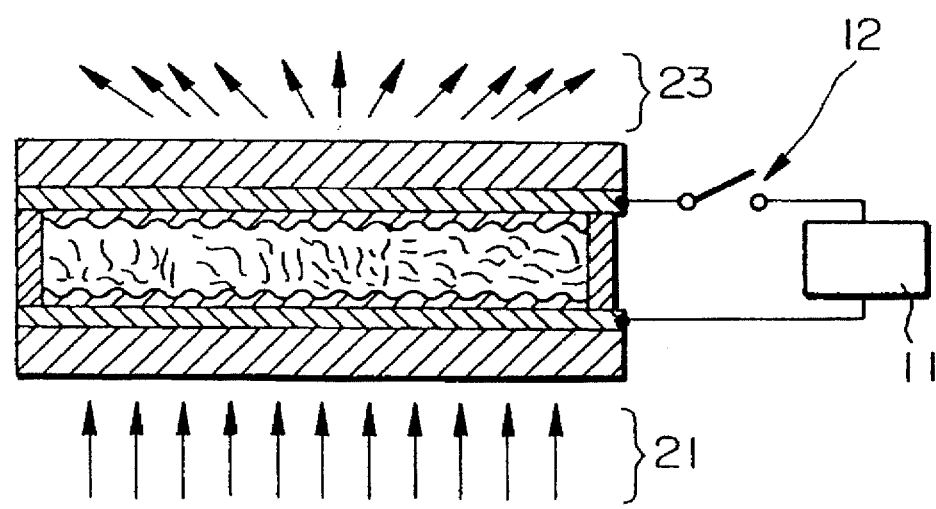

In contrast, when no voltage is applied as shown in FIG. 2B, the liquid crystal suffers only slight alignment regulation forces from the interfaces with the layers 15, 16 of the opposite substrates 3, 6. Thus, the molecules of the liquid crystal turn in random directions. As a result, the light 21 is scattered during the passage through the liquid crystal layer 8. Thus, the liquid crystal device becomes opaque, not permitting any display.

Figure 3:
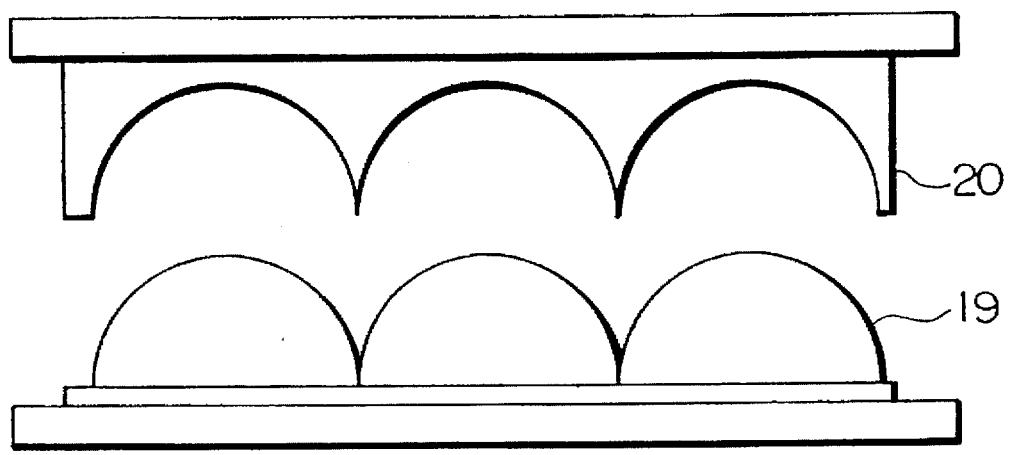
FIG. 3 is a schematic cross sectional view showing a pair of patterned members capable of engaging or fitting each other according to one example of the invention.
Figure 4:
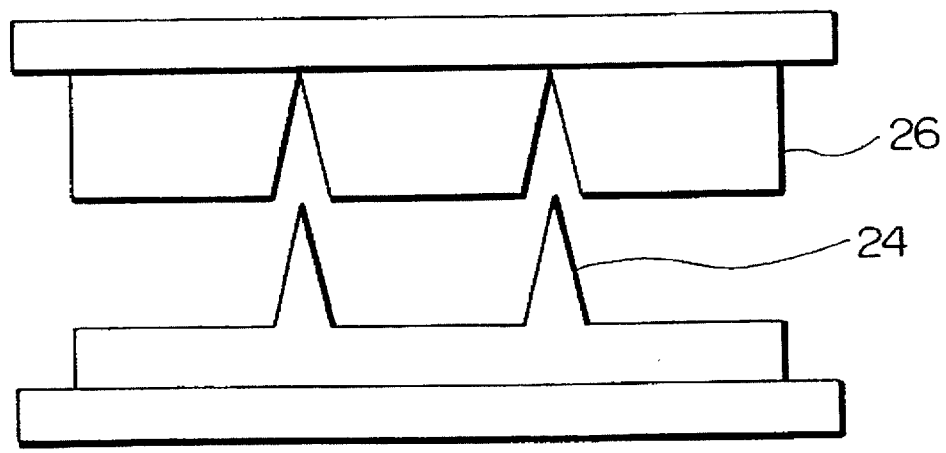
FIG. 4 is a schematic cross sectional view showing a pair of patterned members similar to FIG. 3 according to another example of the invention.
Figure 5:
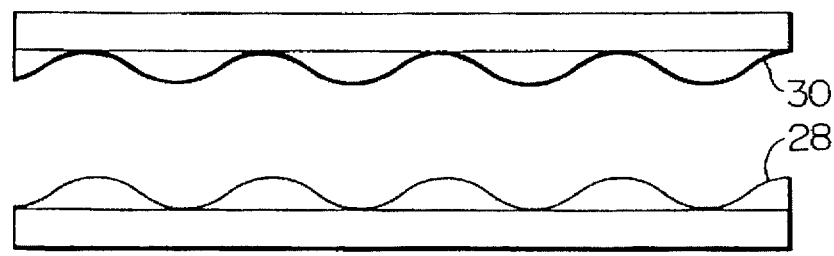
FIG. 5 is a schematic cross sectional view showing a pair of patterned members according to another example of the invention.
Figure 6:
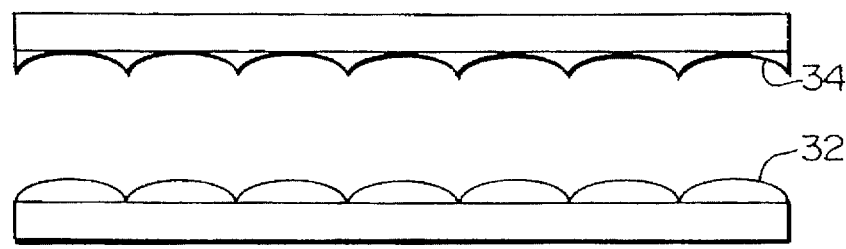
FIG. 6 is a schematic cross sectional view showing a pair of patterned members according to another example of the invention.
Figure 7:
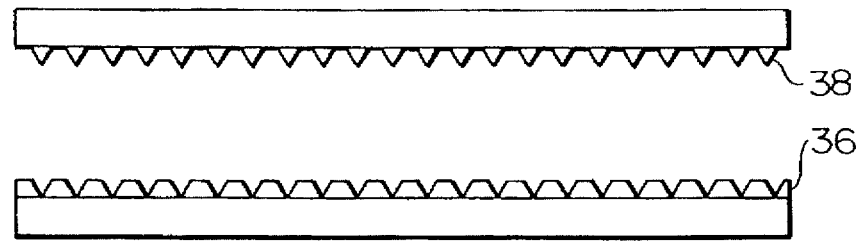
FIG. 7 is a schematic cross sectional view showing a pair of patterned members according to another example of the invention.
Figure 8:
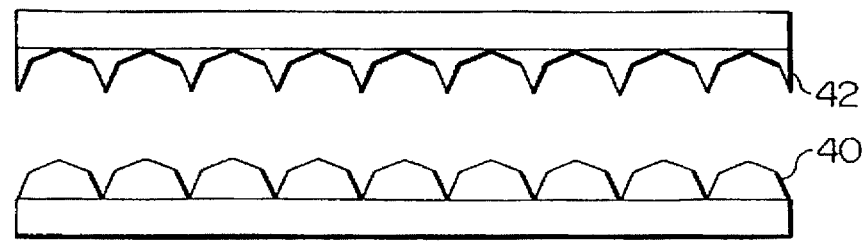
FIG. 8 is a schematic cross sectional view showing a pair of patterned members according to another example of the invention.

The pattern embossed layers 15, 16 may be in any form provided that the above requirements are satisfied. Aside from the wavy form combination as shown in FIG. 1, there may be mentioned combinations of other forms including in section: a combination of a linkage of semi-circular protrusions 19 and counter recesses 20 as shown in FIG. 3; a combination of a plurality of cone-shaped protrusions 24 and corresponding recesses 26 as shown in FIG. 4; a combination of a wavy pattern 28 having a long wavelength and a corresponding wavy pattern 30 as shown in FIG. 5; a combination of a linkage of semi-oval protrusions 32 and corresponding recesses 34 as shown in FIG. 6; a combination of a linkage of trapezoids 36 and a corresponding counter pattern 38 as shown in FIG. 7; and a combination of a linkage of semi-octagonal protrusions 40 and corresponding recesses 42 as shown in FIG. 8.

The pattern embossed layers should desirably scatter light as much as possible. It is preferred that the flat portions of the pattern should be reduced as small in number or area as possible. In this sense, the combinations of the pattern forms shown in FIGS. 1, 3, 5 and 6 are preferred.

In order to more scatter light, the surface areas of the pattern embossed layers should preferably be as great as possible. For instance, when two surface profiles of the pattern embossed layers are both wavy as having the same amplitude, a shorter wavelength is preferred. Alternatively, with the patterns as shown in FIG. 3, the semi-circular protrusion should preferably have a diameter of 1 μm to several tens μm. If the diameter is smaller than 1 μm, the surface profile adversely influences the wavelength of light with the possibility that colors may be developed.

Figure 11:
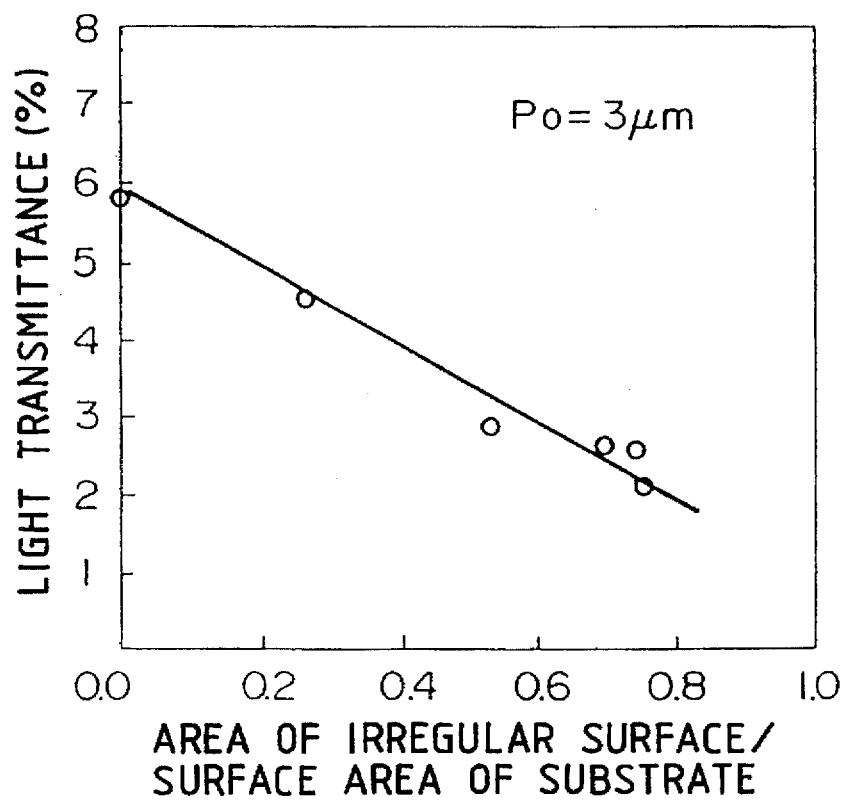
FIG. 11 is a graph showing the relation between the light transmittance and the value of an embossed surface area relative to a substrate surface area.

The change of light transmittance relative to the surface area of the embossed layer is measured. The results of the measurement are shown in FIG. 11. In FIG. 11, the abscissa indicates an increment in surface area of the embossed surface relative to the flat substrate surface wherein if no increment relative to the flat substrate surface, the value is 0.0. If an increment in surface area caused by the formation of the embossed layer is equal to the surface area of the flat substrate or if the surface area of the embossed surface doubles that of the flat substrate surface, the value is expressed as 1.0.

The tested embossed body is as shown in FIG. 3 with an average thickness of 3 μm.

FIG. 11 reveals that when the increment in the surface area caused by the formation of the embossed body increases, the light transmittance decreases, thus enhancing the function of scattering light. This means that when the embossed layer is formed to increase the surface area, the degree of light scattering increases at the time when no voltage is applied, thereby increasing a contrast relative to the case where the liquid crystal device is driven.

The liquid crystal device of this embodiment makes use of a scattering mode without use of any expensive polarizer. Since the embossed body or layer is fixed to a substrate, a liquid crystal substance can be injected into a cell according to a known vacuum injection method, resulting in a high yield. The device can stand a long-time use and is simple in structure and permits a distribution of voltage applied to the liquid crystal layer to be uniform. In addition, the sharpness of the V/T characteristic is improved with a great width of effective hysteresis, ΔH, in bistable drive, ensuring the ease in a substantial bistable drive. The unevenness of the liquid crystal display can be reduced.

The pattern embossed body or layer of the embodiment 2 is preferably fabricated in the following manner.

Fabrication Example 1

Figure 12:
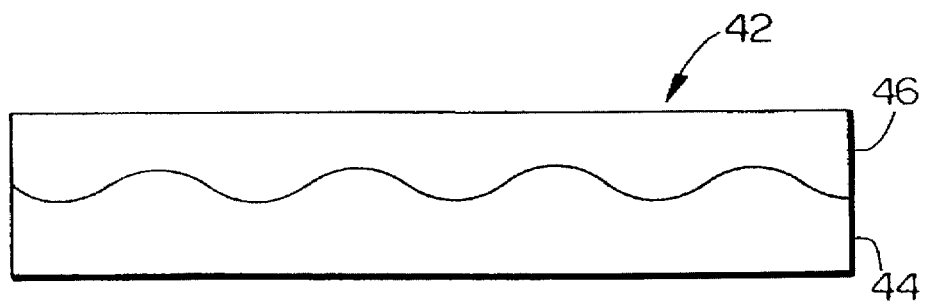
FIG. 12 is a schematic view showing an example of embossing dies or plates.

This is illustrated with reference to FIG. 12. A precursor for embossing die member made, for example, of heat-resistant resins, ceramics or metals is provided. When a body to be embossed is in a wavy surface profile, a precursor 12 is cut, for example, into halves whose cut faces are in coincidence with a wavy form as shown in FIG. 12. The cut pieces are divided into two embossing dies or members 44, 46 having given numbers of protrusions and recesses of given sizes, respectively.

Figure 13A:
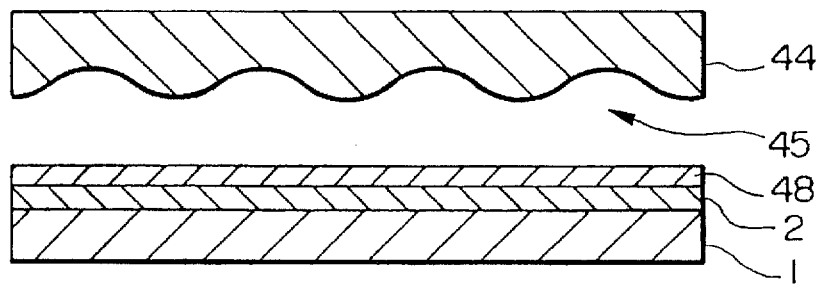

Then, as shown in FIG. 13A, two glass substrates each having a base 1, on which a transparent electrode 2 and a protective film (not shown) are formed, are provided as a first substrate and a second substrate, respectively, (only one substrate shown in FIG. 13A). A film 48 to be embossed, which is made, for example, of a polyamide having a refractive index of 1.520, is formed on the substrate at the side of the transparent electrode 2.

Figure 13B:
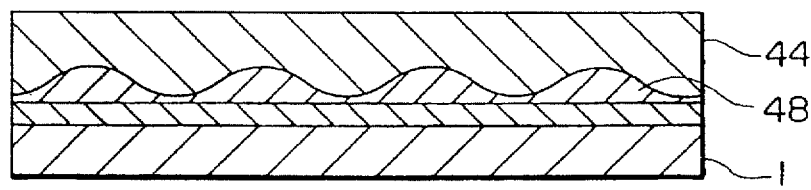
Figure 13C:
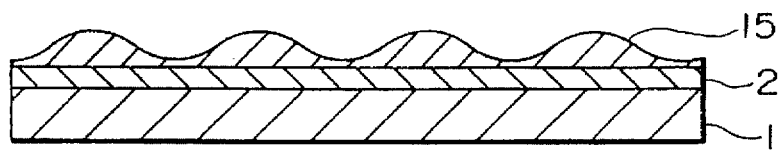

Subsequently, the embossing die member 44 is pressed against the film 48 under conditions, for example, of both a substrate temperature and a die temperature of 170° C. as shown in FIG. 13B. By this, the film 48 is embossed according to the shape of an embossing surface 45 of the die member 44. Thereafter, both the substrate temperature and the die temperature are cooled down to 90° C., after which the die member 44 is removed from the substrate surface, leaving the embossed layer 15 on the substrate 3 as shown in FIG. 13C.

Likewise, the embossed layer 16, as shown in FIG. 1, is formed on the other substrate to provide the second substrate 6. In the case, another embossing die member 46 is used.

The liquid crystal device 10 is assembled and a liquid crystal is film according to known procedures, respectively.

As will be apparent from the above, since the embossing dies 44, 46 which have been originally combined together are used, the embossed layer 15 formed on the first substrate 3 and the embossed layer 16 formed on the second substrate 6 have, respectively, surface profiles which are snugly fitted together.

According to the above method, since the two embossing dies 44, 46 are obtained from one embossing die precursor, the surface profiles of embossed bodies are readily fitted.

Fabrication Example 2

This example is described with reference to FIGS. 14A to 14C.

The embossed bodies can be formed according to an offset transfer method.

More particularly, like the third embodiment, two glass substrates each having a base 1 on to which a transparent electrode 2 and a protective film (not shown) are formed are provided (only one substrate shown in FIG. 14A). A film 50 which is made of a polyamide having a refractive index of 1.520 is formed on one side of the base 1 as shown in FIG. 14A. Separately, a thermoplastic polyamide resin having a refractive index of 1.520 is filled in the respective recesses 51 of the embossing plate 44 having a given size and a given distribution density of the recesses and is placed in-face-to-face relation with the substrate as shown in FIG. 14A.

The thus filled embossing die member 44 is pressed against the substrate surface as shown in FIG. 14B. At the time, the substrate temperature is set, for example, at 170° C. and the die temperature is set at 200° C. Thereafter, the substrate temperature and the die temperature are both cooled down to 90° C., followed by separation of the die member 44 from the substrate surface to transfer the thermoplastic resin material filled in the recesses 51 of the die member 44 to the substrate surface while keeping the shape of the recessed pattern. As a result, the embossed pattern 15 is formed as shown in FIG. 14C.

According to this method, a desired pattern having a uniform pattern shape can be obtained with good reproducibility.

Fabrication Example 3

A pattern embossed layer can be formed using UV curable resins.

As shown in FIG. 15A, two glass substrates each having a base 1 and a transparent electrode 2 and a protective film (only one substrate is shown) formed on the base 1 in this order, like the third and fourth embodiments. Separately, a die member 44 is provided as having recesses with a given size at a given distribution density and filled in the recesses with a UV curable resin 56 having, for example a refractive index of 1.523. The thus filled die member is placed in-face-to-face relation with the substrate as shown in FIG. 15A.

The UV curable resins should preferably photocurable vinyl resins. Examples of such resins include photocurable acrylic resins and particularly those acrylic resins having acrylic oligomers capable of curing through polymerization by irradiation of light, e.g. ester acrylates, ether acrylates, ester urethane acrylates, ether urethane acrylates, butadiene urethane acrylates, epoxy acrylates, amino resin acrylates, acrylic resin acrylates and the like.

Subsequently, the die member 44 is pressed against the substrate surface as shown in FIG. 15B. While the substrate temperature and the die temperature are, respectively, set at room temperature, UV light 58 is irradiated from the back side of the substrate until the UV curable resin is cured thereby fixedly bonding to the substrate surface. Thereafter, the die member 44 is separated from the substrate surface to form an embossed layer 15 on the substrate surface as shown in FIG. 15C.

The use of the UV curable resin is advantageous in that it is not necessary to heat the substrate and the resin, so that this method is applicable to a substrate which is not resistant to heat.

The resins usable in this embodiment include not only UV curable resins, but also resins which are curable application of visible light or electron beams.

The procedures of fabricating the liquid crystal device of the embodiment 2 are described. In this type of liquid crystal device, the materials for the embossed layer should preferably have a dielectric constant, $\epsilon p$, which is higher and is as close to that of a liquid crystal substance as possible. If the dielectric constant, $\epsilon LC$, of a liquid crystal substance and the dielectric constant, $\epsilon p$, of the embossed layer are closer to each other, the voltage being applied to the liquid crystal layer becomes more uniformed as having set out with respect to Embodiment 1. Moreover, when the embossed layer is made of a material whose dielectric constant, $\epsilon p$, is higher, a saturation voltage for driving the resultant liquid crystal device becomes lower, ensuring a lower drive voltage for a liquid crystal display device. This eventually leads to saving of consumption power.

What is claimed is:

1. A liquid crystal display comprising:

first substrate having first surface;

a second substrate having second surface, the second substrate attached to the first substrate such that a space is formed between the first and second surfaces;

a first embossed layer formed on the first surface of the first substrate, the first embossed layer having an irregular pattern including curved surfaces which faces the second layer across the space;

a liquid crystal substance filled in the space between the second surface and the first embossed layer;

wherein a refractive index of the first embossed layer is substantially equal to a refractive index of the liquid crystal substance, and wherein an average dielectric constant of the first embossed layer is substantially equal to a dielectric constant of the liquid crystal substance.

2. The liquid crystal display according to claim 1, wherein a second embossed layer is formed on the second surface of the second substrate, the second embossed layer having an irregular pattern including curved surfaces which are cooperatively aligned with the curved surfaces of the first embossed layer such that a distance between the curved surfaces of the first and second embossed layers in a direction perpendicular to the first and second surfaces is substantially constant.

3. The liquid crystal display according to claim 1, wherein the curved surfaces of the first embossed layer are semi-spherical.

4. The liquid crystal display according to claim 2, wherein the curved surfaces of the first and second embossed layers are semi-spherical.

5. The liquid crystal display according to claim 1, wherein the curved surfaces of the first embossed layer are corrugated.

6. The liquid crystal display according to claim 2, wherein the curved surfaces of the first and second embossed layers are corrugated.

* * * * *